United States Patent [19]
Akeel

[11] Patent Number: 4,638,143
[45] Date of Patent: Jan. 20, 1987

[54] ROBOT-LASER SYSTEM

[75] Inventor: Hadi A. Akeel, Sterling Heights, Mich.

[73] Assignee: GMF Robotics Corporation, Troy, Mich.

[21] Appl. No.: 694,031

[22] Filed: Jan. 23, 1985

[51] Int. Cl.[4] .............................................. B23K 26/00
[52] U.S. Cl. ..................... 215/121 LQ; 219/121 LV;
219/121 LU; 219/121 LC; 901/47; 901/50;
901/42
[58] Field of Search ................ 219/121 LV, 121 LU,
219/121 LQ, 121 LC, 121 L; 901/6, 8, 4, 42, 50,
901/47, 49

[56]    References Cited
U.S. PATENT DOCUMENTS

| 4,473,074 | 9/1984 | Vassiliadis | 219/121 LQ |
| 4,539,462 | 9/1985 | Plankenhorn | 219/121 LV |
| 4,542,278 | 9/1985 | Taylor | 219/121 LV |
| 4,555,610 | 11/1985 | Polad et al. | 219/121 LV |

FOREIGN PATENT DOCUMENTS

| 2551860 | 3/1985 | France | 219/121 LU |
| 0136589 | 10/1980 | Japan | 219/121 LU |
| 5921491 | 2/1982 | Japan | 219/121 LQ |

Primary Examiner—M. H. Paschall
Attorney, Agent, or Firm—Brooks & Kushman

[57]    ABSTRACT

A robot-laser system having at least one mirror under active program control for reflecting a laser beam from a fixed laser beam source to a desired location. Preferably, first and second mirrors are mounted on an outer arm of the robot to move therewith and rotate relative thereto. A third mirror reflects the laser beam to the first and second mirrors. A programmable servo system automatically moves each of the mirrors relative to and in synchronization with movement of the moving parts of the robot. Each of the mirror is mounted for rotation about a pair of intersecting axes so that the laser beam strikes the point of intersection. In one of the disclosed embodiments a fourth mirror reflects the laser beam from the source to the other mirrors.

17 Claims, 5 Drawing Figures

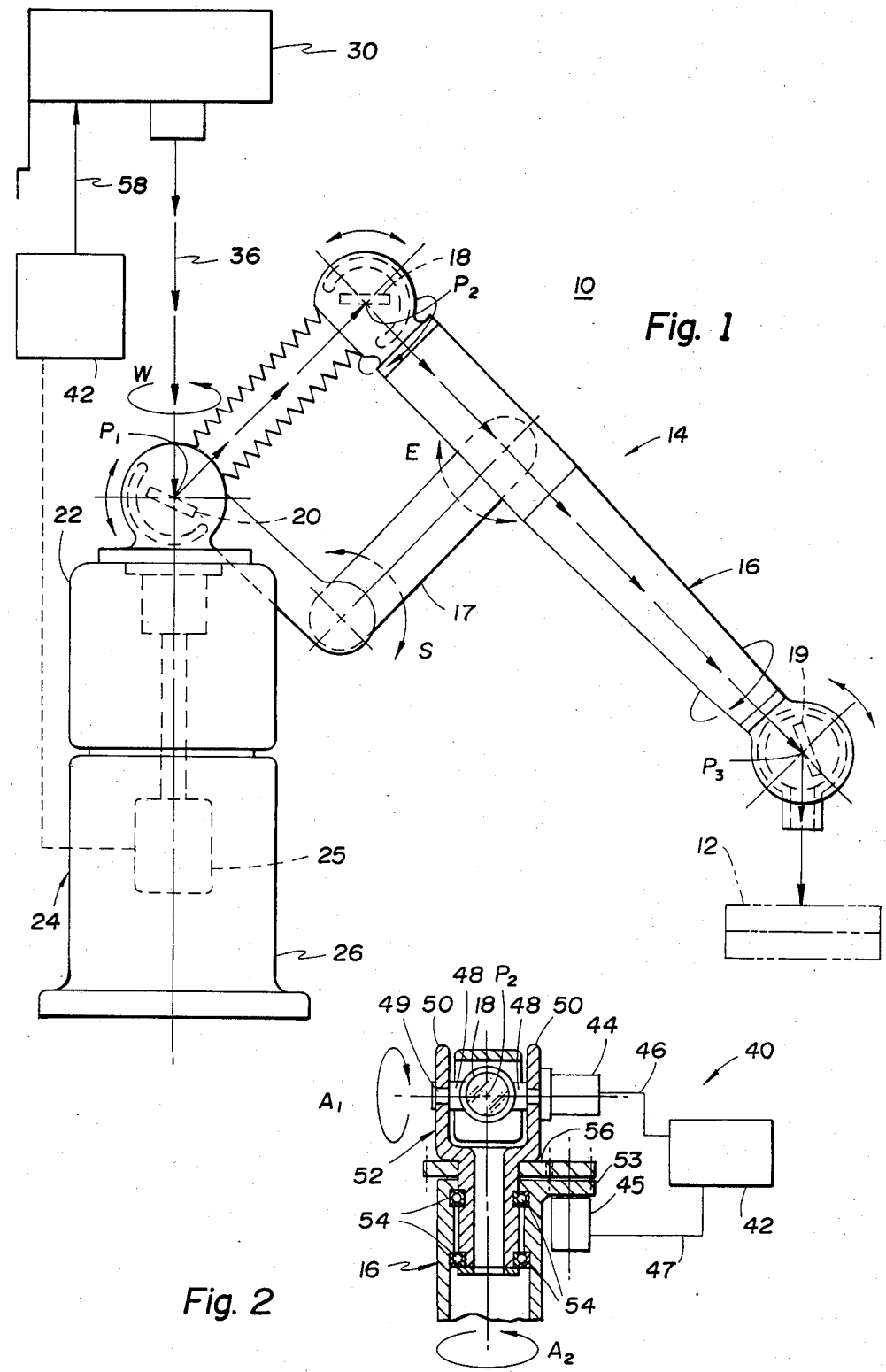

ROBOT-LASER SYSTEM

TECHNICAL FIELD

This invention relates to robot-laser systems and, in particular, to robot-laser systems having an automatic control systems for automatically controlling the path of the laser beam as the robot moves.

BACKGROUND ART

Robot capabilities range from very simple repetitive point to point motions to extremely versatile movement that can be controlled in sequence by a computer as a part of a complete integrated manufacturing system. Robots have been used in many material processing applications including cutting, trimming and welding.

Laser applications can be divided into several general categories including the measurement of spacial parameters, material heating and/or removal, non-destructive probing of resonant phenomena, communications, optical processing, laser-induced chemical reactions and weapons.

The combination of a laser with a robot allows the laser to operate with a degree of freedom previously unknown. The combination of the two technologies, if successfully performed, is suitable for most laser applications, including material processing applications. The same laser can be used in processing many kinds of materials by controlling the speed and the power of the laser. This laser can cut metal, cut glass, trim plastic or weld aluminum. Because robots are typically controlled by a programmed computer, the same computer can be used to regulate the laser's power. Consequently, in a flexible manufacturing line, parts can be cut or welded one after the other simply by adjusting the power of the laser.

Lasers are currently in operation in both commercial and industrial environments. For example, many parts of an automobile are processed with lasers. Also, a large percentage of vision systems that measure depth are laser-based.

Another industrial use of the laser is laser-assisted machining wherein the laser beam is applied in front of a cutting tool to reduce tool wear and cutting forces. Such an application results in fewer tool changes, decreased total tool wear and tool cost, increased cutting speeds and increased amounts of materials that can be cut.

Two types of lasers are typically used in material processing applications, solid state and carbon dioxide lasers. The carbon dioxide lasers are relatively unlimited in power. The solid state lasers are limited in power and require more elaborate shielding than the carbon dioxide lasers.

Popular uses for metal-working lasers include seam, spot and fusion welding, cutting, drilling, surface hardening, metal marking, scarfing, deburring, trimming and heat treating. The advantages of laser processing are particularly evident in welding. Welding done with lasers often requires no additional work such as grinding. With traditional welding, welds must be reworked a large percentage of the time. Therefore cost savings are an important aspect of laser welding.

Two methods have developed in order to link lasers with robots. One method is to move a part via a robot into the laser beam. The other way is to move the beam via the robot to the part. The latter method is effective if the part is too large to be moved easily or when contouring is necessary.

One relatively new concept of linking robots with lasers is using more than one robot to share a laser beam. Sharing systems are only limited by the cycle times of the various operations being done.

Another concept that is relatively new is mounting the laser on the top of an articulated-arm robot.

Another method of linking the robot with a laser incorporates two mirrors in each joint of a laser arm which is manipulated by the robot. The mirrors must be held in place very securely and precisely for the beam cannot be misdirected a fraction of a degree as it proceeds along its path. Vibrations of the robot that could affect the mirror positions must be taken into account in such a design. A focusing lens concentrates the laser energy and directs it to a singular point with a high power density. The robot must be very accurate to direct the beam to a precise area on a workpiece. A longer focal length lens can be used to compensate for robot inaccuracies. However, the resulting beam is focused over a larger area so that both power density and speed are lower.

Despite the above-noted problems in linking the laser with the robot, it is highly desirable to forge this linkage especially because the laser is an ever sharp tool having a non-contact method of operation. The use of the laser also eliminates the need for tactile feedback, adaptive circuitry, sensory perception and tool wear because the laser and the part do not touch each other.

As previously mentioned, in manipulating high power laser beams in welding robots, the beam is usually reflected off several mirrors located at the joints of a tubular linkage mechanism which has several articulations. The mechanism is then manipulated by the robot to direct the laser focal point along the desired path. Two mirrors are usually required at each joint to direct the beam from one link orientation to another. Since manipulators generally require five to seven articulations to provide the necessary motion to access the workpiece at a specific orientation the number of mirrors needed to provide the laser beam at the workpiece can be as many as 14. Accuracy of the laser path depends on the accuracy of the robot and laser arm and mirror alignment which are not corrected for by programming. Also, power loss, overheating and cracking, misalignment, higher cost of accuracy and space and weight limitations make this approach impractical for general purpose manipulators. Such an approach is disclosed in the U.S. Pat. No. 3,913,582 to Sharon.

U.S. patents which disclose rotatably adjustable mirrors include the U.S. Pat. Nos. 3,528,424 to Ayres, Ditto 4,059,876 and Malyshev et al 4,144,888.

The U.S. Pat. No. 4,429,211 to Carstens et al., discloses a pipe welding system including a seam tracker to keep the focal spot on the seam to compensate for axial and radial variations of the pipe. An active beam alignment system operates in real time to compensate for angular misalignment. Individually controlled mirrors reflect the laser beam in order to weld the pipe.

Other patents of less relevance include the U.S. Pat. Nos. 3,736,402 to Mefferd et al., Fletcher et al 3,888,362 and Sakuragi et al 4,443,684.

DISCLOSURE OF THE INVENTION

An object of the present invention is to provide a robot-laser system which is more accurate, has a lower cost and has greater reliability than prior art robot-laser systems.

Another object of the present invention is to provide an improved robot-laser system which allows lightweight, low power, low cost manipulators to be used for heavy duty applications such as the welding of industrial components and automobile bodies. In such application, the robot will only carry and manipulate lightweight mirrors rather than heavy welding equipment or relatively clumsy and heavy laser beam-guiding articulations.

A further object of the present invention is to provide a robot-laser system which allows the manipulator to be built with simplicity of design, ease of use, high accuracy and low cost due to the relatively light weight of the laser beam manipulating parts of the system.

Yet still another object of the present invention is to provide a robot-laser system which integrates the laser arm and the robot so that the laser beam path is programmable while utilizing only a minimum number of laser beam-reflecting mirrors. The robot acts as a support for the mirrors and a shroud for the laser beam. Inaccuracies of the robot are compensated by mirror programmability.

In carrying out the above objects and other objects of the present invention, a robot-laser system constructed in accordance with the present invention includes a laser beam source, a robot including a plurality of movable parts and at least one mirror for reflecting the laser beam from the source to the desired location wherein the mirror is mounted on a movable part of the robot to move therewith and relative thereto. An automatic control system automatically moves the mirror relative to and in synchronization with movement of the movable parts.

Further in carrying out the above objects and other objects of the present invention, the robot-laser system preferably includes at least two mirrors for reflecting the laser beam from the source to the desired location. Each mirror is each mounted on a movable part of the robot to move therewith. The mirrors are rotatable relative to the movable parts of the robot.

Preferably, the control system comprises a programmable servo system. Also, preferably, the laser beam source is positioned at a fixed location.

The advantages of this design are numerous including:

reduction in the required number of mirrors;
less power loss;
full control of laser beam orientation through mirror programmability;
ease of teaching by the lead-through method;
insensitivity to slight mirror misalignment in assembly since all mirrors are under active feedback control; and
reduced cost and higher precision obtainable from use of lightweight manipulators.

Other advantages of the present invention will be readily appreciated as the same becomes better understood by reference to the following detailed description when considered in connection with the accompanying drawings.

BRIEF DESCRIPTION OF THE DRAWINGS

FIG. 1 is a schematic view illustrating a robot-laser system constructed in accordance with a first embodiment of the present invention;

FIG. 2 is a sectional view, partially broken away, illustrating the mechanism by which a mirror mounted on an outer arm of the robot may be rotated about two intersecting axes;

BEST MODE FOR CARRYING OUT THE INVENTION

Figure 3:
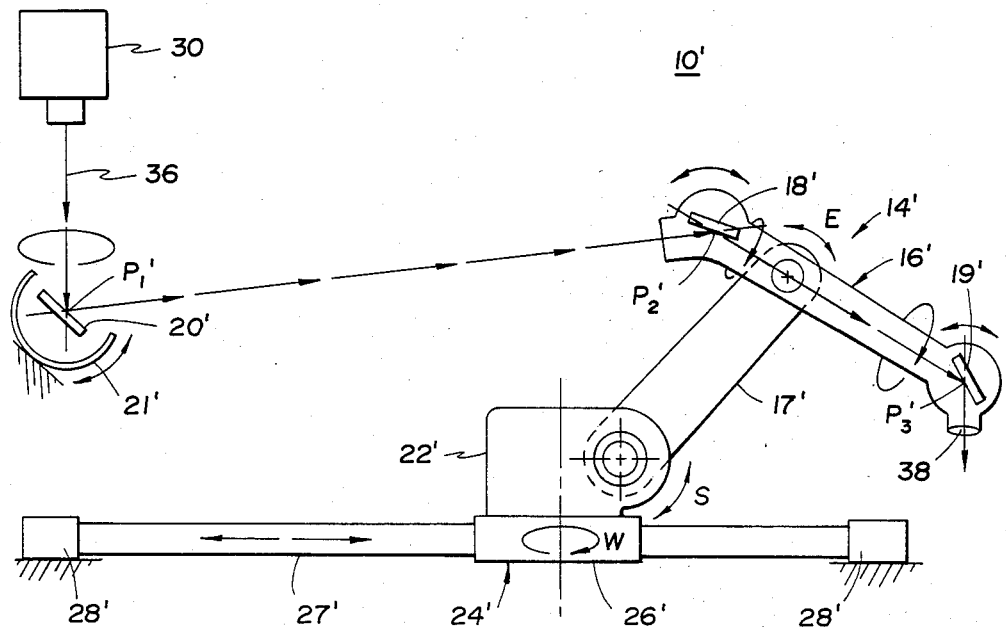
FIG. 3 is a schematic view illustrating a second embodiment of the robot-laser system with a robot movably mounted on a track.
Figure 4:
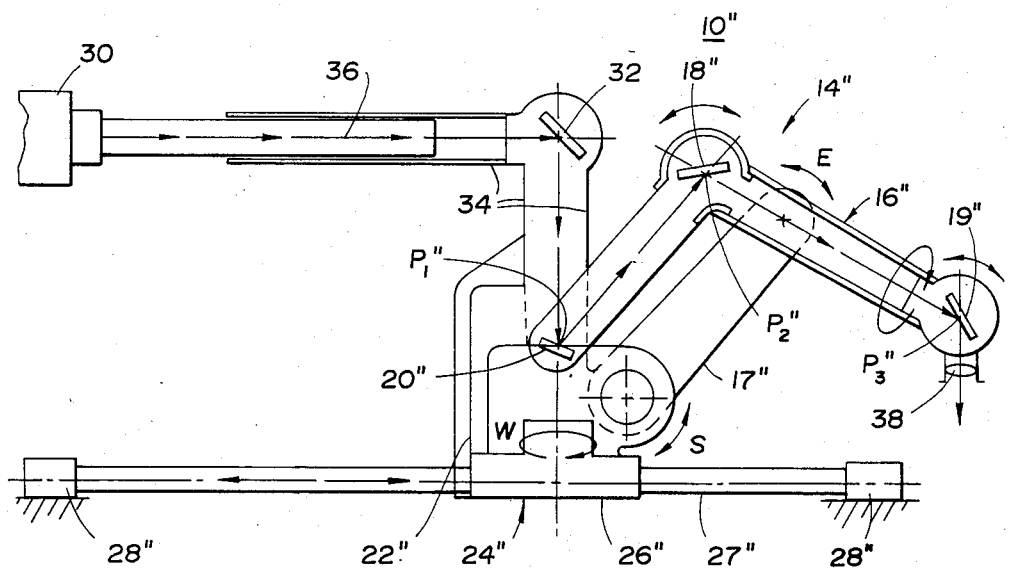
FIG. 4 is a schematic view illustrating a third embodiment of the robot-laser system, similar to the second embodiment, utilizing a fourth mirror to manipulate the laser beam.

Referring now to the drawings, there are illustrated in FIGS. 1, 3 and 4 different embodiments of a robot-laser system constructed in accordance with the present invention. The embodiments are collectively indicated at 10, 10' and 10", respectively. The systems 10, 10' and 10" are useful in directing laser beams to a desired location which may be occupied by a workpiece 12 as shown in FIG. 1.

Briefly, each of the robot-laser systems shown in FIGS. 1, 3 and 4 includes a minimum number of mirrors which are controlled by a programmable servo system. Such a system reduces the need for extreme accuracy in initially locating one mirror relative to another. The system is self-correcting with respect to its inherent inaccuracy and excessive misalignment. As a result, a relatively lightweight, low power and low cost manipulator or robot, generally indicated at 14, 14' and 14" in FIGS. 1, 3 and 4, respectively, can be used for such heavy duty application as welding of industrial components and automobile bodies. Each of the robots need only carry and manipulate relatively lightweight mirrors instead of heavy welding equipment or clumsy and heavy laser beam-guiding articulations. This lightweight payload allows the robots to be built with simplicity of design, ease of use, high accuracy and low cost.

Each of the robots 14, 14' and 14" comprises a three-axes manipulator with freedom to rotate about axes W, S and E. Each of the robots 14, 14' and 14" includes an outer arm 16, 16' and 16", respectively, and an inner arm 17, 17' and 17", respectively. Each of the arms 16, 16' and 16" is hollow and has mounted therein a pair of spaced part mirrors 18 and 19, 18' and 19' and 18" and 19", respectively. Each robot-laser system also includes a third mirror 20, 20' and 20", respectively. The mirror 20 is mounted to rotate about one axis on the upper rotatable part 22 of a base, generally indicated at 24. The upper part 22 and, consequently, the mirror 20 also rotates about the axis W relative to a lower part 26 of the base 24 upon actuation of a servo motor indicated in phantom at 25. The other servo motors of the robots 14, 14' and 14" are not shown for the sake of simplicity.

In the same fashion, an upper part 22' of a base, generally indicated at 24', rotates about its axis W relative to a lower part 26' of the base 24'. The third mirror 20' is rotatably mounted on a fixed frame 21' at a location relatively close to the robot 14' in order to remain in sight of the mirror 20' at all times.

The third mirror 20" is mounted to rotate about one axis on the upper part 22" of a base member, generally indicated at 24". The upper part 22" rotates about the axis W relative to a lower part 26" which is mounted for sliding movement on a track 27". The track 27" extends between a pair of fixed members 28". In the same fashion, the lower part 26' is mounted for sliding movement on a track 27'. The track 27' extends between a pair of fixed members 28'.

Each inner arm 17, 17' and 17" is rotatably connected at its opposite ends to its respective outer arm 16, 16' or 16" to rotate about its respective E axis. Each inner arm 17, 17' and 17" is also rotatably connected to its respective upper part 22, 22' and 22" of its respective base 24, 24' and 24" to rotate about its respective S axis.

Each of the mirrors 18, 18' 19, 19', 19" and 20' is rotatably mounted to have two degrees of rotational freedom. The mirrors 18", 20 and 20" are mounted to have one degree of rotational freedom apart from the rotatable robot part to which they are attached. The various degrees of rotational freedom allow the laser beam generated by a laser beam source 30 to sweep the entire work space of each of the robots 14, 14' and 14".

The third embodiment of the robot-laser system 10" as shown in FIG. 4 includes a fourth mirror 32 which is fixedly mounted on the base 24" to move therewith to simplify the programmability of the other mirrors and also allow the use of extensible light shields 34 to extend between the source 30 and the fourth mirror 32 and between the mirrors 18", 32 and 20". The shields 34 protect the laser beam from the environment.

As shown in FIGS. 1, 3 and 4, the laser beam source 30 is located in a fixed position. However, it is to be understood that the laser beam may be alternatively mounted on the base or on one of the arms of the robot to further reduce the number of mirrors required.

The laser beam 36 is aimed at points $P_1$, $P_1'$ and $P_1''$ (after striking fourth mirror 32) in FIGS. 1, 3 and 4 respectively, where the two axes of rotation of each of the mirrors 20, 20' and 20", respectively, intersect. The mirrors 20, 20' and 20" can be oriented by rotation about their two axes to direct the laser beam 36 to second points $P_2$, $P_2'$ and $P_2''$ where the two axes of rotation of the mirrors 18, 18' and 18", respectively, intersect. Similarly, the laser beam 36 can be directed by the mirrors 18, 18' and 18" towards third points $P_3$, $P_3'$ and $P_3''$ respectively, where the two axes of rotation of the mirrors 19, 19' and 19" intersect. The mirrors 19, 19' and 19" can then direct the laser beam 36 towards any desired location, such as the workpiece 12 for workpiece or material processing. The laser beam 36 can be focused on the workpiece 12 by means of a focusing lens 38 as shown mounted adjacent one end of the outer arms 16' and 16" in FIGS. 3 and 4. Alternately, the mirrors 19, 19' and 19" can be shaped as focusing mirrors.

While not shown, each of the robots 14, 14' and 14" may include other equipment such as grippers, fixtures or other equipment. Also, each of the robot-laser systems 10, 10' and 10" may include additional mirrors which may be either fixed or programmable in order to help in directing the laser beam 36 favorably to the workpiece 12.

Referring now to FIG. 2 there is illustrated a preferred mechanism for rotating any one of the mirrors about a pair of intersecting rotational axes such as axes $A_1$ and $A_2$ without rotating the part of the robot 14 on which the mirror is mounted. While the mirror 18 is illustrated, it is to be understood that any of the mirrors could be rotated in the same or similar fashion. The axes $A_1$ and $A_2$ in the example shown in FIG. 2 intersect at the point $P_2$ of the mirror 18.

An automatic control system such as servo system generally indicated at 40 includes a controller such as a computer, a microprocessor or a programmable controller, such as programmable controller 42 and servo motors 44 and 45. In general, the servo system 40 automatically moves the supporting apparatus of the mirror 18 relative to and in synchronization with movement of the different moving parts of the robot 14. The programmable controller 42 may also serve as the controller for the robot 14. The controller 42 controls the actuation of the servo motors 44 and 45 along bidirectional lines 46 and 47, respectively. The lines 46 and 47 also represent feedback paths so that the controller 42 can actively control the servo motors 44 and 45.

The mirror 18 is mounted on a shaft 49 between spacers 48 mounted thereon so that the mirror 18 rotates with the shaft 49 about the axis $A_1$. The shaft 49 is coupled to the drive shaft of the motor 44 which is mounted on an arm 50 of a yoke or gimbal, generally indicated at 52. The mirror 18 is positioned between the arms 50 of the gimbal 52. In turn, the gimbal 52 is rotatably mounted at one end of the outer arm 16 to rotate about the axis $A_2$. The gimbal 52 is mounted by bearings 54 positioned in the end of the outer arm 16. Energization of the servo motor 45 which is mounted on a flange portion 53 of the outer arm 16 causes its drive shaft to rotate a gear 55 fixedly mounted thereon. In turn, the gear 55 rotates a toothed collar member 56, which is fixedly mounted on the gimbal 52 immediately below the arms 50, thereby causing the entire yoke 52 to rotate.

A controller such as the programmable controller 42 not only controls the various servo motors of the robots 14, 14' and 14" and mirrors 18, 18', 18", 19, 19', 19", 20, 20' and 20", but also controls the level of power of the laser beam 36 emitted from the laser beam source 30 along a control line 58. The various programmable controllers and servo motors are omitted from the embodiment of FIGS. 3 and 4 for purposes of clarity. However, it is to be understood that each programmable controller not only controls the power level of the laser beam 36 but also control the various movements of its respective robot 14, 14' or 14" in synchronization with the control of the various servo motors which control rotation of its respective mirrors 18, 18', 18", 19, 19', 19", 20, 20' and 20".

TEACHING THE ROBOT OF THE ROBOT LASER SYSTEM

In programming or teaching any one of the robots 14, 14' or 14", the mirrors 20, 20', 20" and the mirrors 18, 18' and 18" may be essentially ignored. This can be done by beaming a low power laser beam or ordinary light via a source (not shown) which is temporarily attached to the outer arm 16, 16' or 16" between the mirrors 18 and 19, 18' and 19', or 18" and 19". Such a light beam will simulate the path of the high power beam under normal operation. After such a source is attached to the outer arm 16, 16' or 16", the robot 14, 14' or 14" can be led through a desired path by any of several commonly utilized methods. One method, such as used with lightweight manipulators, is simply to lead the unpowered manipulator by hand. Another is to command individual axes to move as desired from a push button terminal or by means of a joy stick (neither of which are shown). A third method utilizes a force sensing device (not shown) which is attached to the lower end of the outer arm 16, 16' or 16" and senses the force applied by hand when the robot 14, 14' or 14" is led through its path. Each programmable controller is utilized to read the sensor transducer outputs to command the drive circuits of the actuators or servos of its respective robot 14, 14' or 14" and provide the desired motion.

The operator decides on the desired path by aiming the mirror 19, 19' or 19" to the desired location on the workpiece 12. At specific points along the desired path, axes positions can be recorded as well as the desired status of the laser beam i.e. whether it is triggered "on" or "off" and at what power level when "on". The recording command is usually input by pushing a button that controls the controller 42 to read the output of the several feedback devices. These devices may indicate the position of the robot actuators and/or the status of the support equipment at any recording point.

Once path points are recorded they are usually stored in computer memory or peripheral discs for recall in a playback mode whereby the robot 14, 14' or 14" can retrace the path described by the recorded points. In the playback mode the force sensor, if used, can be removed as well as any auxiliary light beam source. The laser beam is required to be directed to one of the mirrors 19, 19' or 19" by the programmed rotations of its corresponding mirrors. In the case of the third embodiment as shown in FIG. 4, the fourth mirror 32 is not programmed because it does not rotate. The programmed rotation of the mirrors 18, 18', 18", 20, 20' and 20" can be done mathematically after the manipulator path has been recorded since the positions of points $P_2$, $P_2'$, $P_2''$, $P_3$, $P_3'$, and $P_3''$ are defined in all instances along the manipulator path. The programming of mirrors 20, 20', 20", 18, 18' and 18" can be done by coding mathematical relations into a computer program which describes the laser path when the robot-laser system 10, 10' or 10" is used. Programming methods will be similar in all cases. Actual computer coding can be similarly done according to process requirements and the type of robot to be used.

MATHEMATICAL PARAMETERS AND CONSTRAINTS IN USING A ROBOT MANIPULATOR WITH THREE AXES TO DIRECT A LASER BEAM ONTO A WORKPIECE

Figure 5:
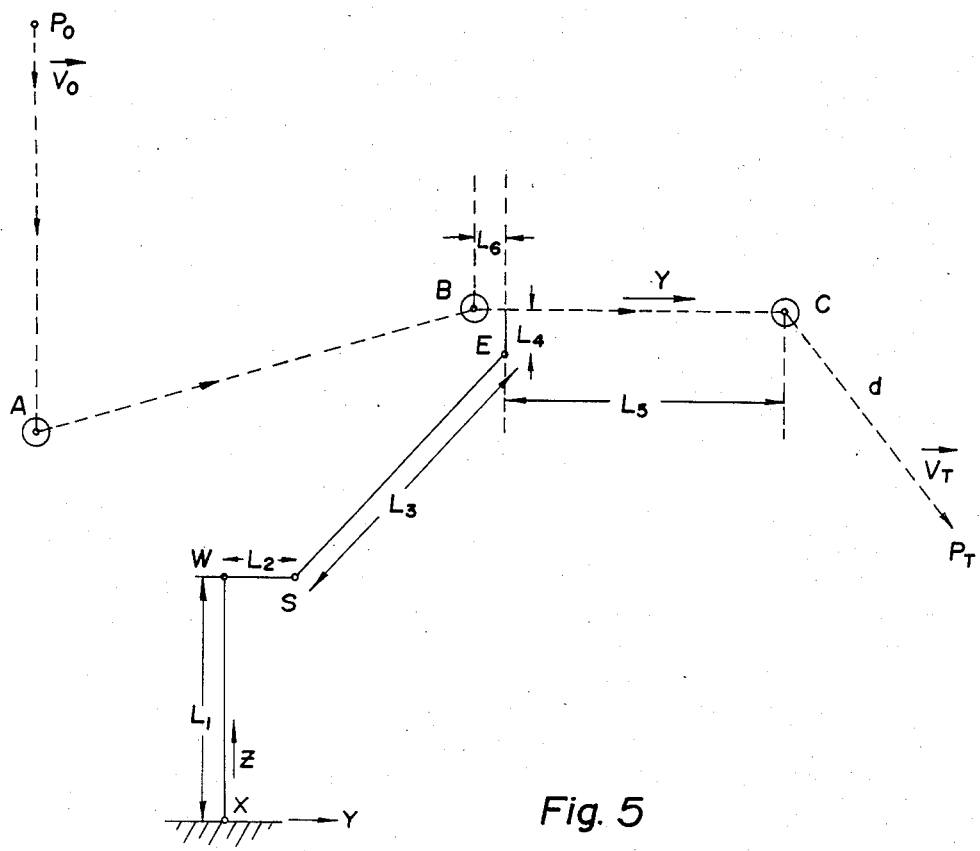
FIG. 5 is a mathematical sketch for obtaining the mathematical derivations of motions of the robot arm and mirrors of the robot-laser system.

The following mathematical parameters and constraints serve as the base for the mathematical derivation and computer coding to control robot and mirror motion as described hereinabove. With reference to FIG. 5 a first mirror A may be either fixedly mounted on the floor in the work environment or mounted on the robot. It rotates about two computer-controlled rotational axes. Two other mirrors B and C are mounted on the outer arm of the robot as previously described. The mirrors B and C rotate with one axis of rotation parallel to the outer arm and the other axis normal to both the outer arm and the E axis. Together these three mirrors have six degrees of freedom. Therefore, six angles of rotation must be determined. The robot is assumed to have three degrees of freedom i.e. about the W, S and E axes. For any laser beam requirement these three robot degrees of freedom along with the six mirror degrees of freedom must be determined. $P_o$ represents thr origin of the laser. $P_T$ represents the point of laser application. $V_o$ and $V_t$ are unit directional vectors. The L's are distances. The distance from the last mirror, C, to the point of application, $P_t$, is represented by d. B, C and E are points on a rigid structure.

The independent parameters that are inputs to the system are:
(i) $V_o$ Directional vector of incident beam to A (A is fixed, thus is not independent). $V_o$ has 3 components, but magnitude is 1 ($\therefore$ 2 independent parameter)
(ii) $V_T$ Directional vector of exit beam to target $V_T$ has three components, but magnitude is 1 ($\therefore$ 2 independent parameters)
(iii) C Position vector of mirror C. C has 3 components, i.e. $C_x$, $C_y$ and $C_z$. C can either come from direct input or C can be derived from a given target point $P_T$ and a distance d along direction $V_T$ ($\therefore$ 3 independent parameters)

The constraints of the robot and mirror system are:
(i) The exit beam of mirror A is also the incident beam to mirror B; and
(ii) The exit beam of mirror B is also the incident to mirror C.

With 7 inputs and 2 constraints, all 9 unknowns can be uniquely solved. The 9 unknowns are: W, S, E, and the angles of rotation of each of the mirrors (i.e. $\theta_{ax}$, $\theta_{ay}$, $\theta_{by}$, $\theta_{bz}$, $\theta_{cy}$, $\theta_{cz}$).

Given the various parameters and constraints of the described robot-laser system a general mathematical solution can be prepared whereby all required robot and mirror motions can be calculated.

The advantages of the above-described robot laser system are numerous. For example, the number of mirrors required to be used in manipulating the laser beam has been greatly reduced from the number required by the prior art. There is less power loss and there is full control of laser beam orientation through mirror programmability. Teaching such a robot laser system through the lead-through method is made relatively easy. Furthermore, slight mirror misalignment in assembly is not fatal since all the mirrors are under active feedback control. Finally, the reduced cost and the higher precision attainable by use of lightweight manipulators enhances the commercial prospects of such a robot-laser system.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A robot-laser system for providing a laser beam at a desired location, the system comprising:
   a laser beam source;
   a robot including a plurality of movable parts including a hollow robot arm having a central axis along which the laser source directs the laser beam;
   at least one mirror for reflecting the laser beam from the source to the desired location, said mirror being mounted within the robot arm to move therewith and relative thereto to about a transverse axis that extends angularly to the central axis of the robot arm; and
   an automatic programmable control system for automatically moving said mirror about said transverse axis relative to and in synchronization with movement of the robot arm to thereby direct the laser beam to the desired location as the arm is moved.

2. A robot-laser system for providing a laser beam at a desired location, the system comprising:

a laser beam source;

a robot having a plurality of movable parts including a hollow robot arm having a central axis along which the laser source directs the laser beam;

at least two mirrors for reflecting the laser beam from the source to the desired location, each of said mirrors being mounted within its respective movable part including said robot arm to move therewith, wherein each of the mirrors is rotatable relative to its respective movable part about a transverse axis that extends angularly to the central axis of the robot arm; and an automatic programmable control system for automatically rotating each of said mirror about their respective transverse axes relative to and in synchronization with movement of its respective movable parts and relative to and in synchronization with rotary movement of the other mirror.

3. The invention as claimed in claim 2 wherein each of said mirrors is rotatable about a pair of intersecting axes of rotation.

4. The invention as claimed in claim 3 wherein said mirrors are arranged and are movable so that the laser beam strikes each of the mirrors at the intersection of the two axes of rotation.

5. The invention as claimed in claim 2 including a third mirror rotatable about a pair of axes of rotation for reflecting the laser beam from the source to the other mirrors.

6. The invention as claimed in claim 5 including a frame member fixed relative to said robot and wherein said third mirror is mounted for movement about the two axes thereon.

7. The invention as claimed in claim 5 including a fourth mirror for reflecting the light from the source to the third mirror.

8. The invention as claimed in claim 7 wherein said fourth mirror is non-rotatable.

9. The invention as claimed in claim 1 or claim 2 wherein said control system comprises a servo system.

10. The invention as claimed in claim 1 or claim 2 including a track wherein said robot is mounted on said track to move thereon.

11. The invention as claimed in claim 1 or claim 2 wherein said source is fixed relative to said robot.

12. The invention as claimed in claim 2 wherein said robot includes an outer arm and wherein said mirrors are mounted for rotation on said outer arm.

13. The invention as claimed in claim 12 wherein said outer arm is hollow and wherein said mirrors are mounted therein.

14. The invention as claimed in claim 13 including a third mirror for reflecting light from the source to the other mirrors and further including shielding means extending between the third mirror and the other mirrors to shield the laser beam from the ambient.

15. The invention as claimed in claim 1 or claim 2 including focusing means mounted on said robot for focusing the reflected laser beam at the desired location.

16. The invention as claimed in claim 15 wherein said focusing means comprises a focusing lens.

17. The invention as claimed in claim 1 or claim 2 wherein said robot comprises a three-axes manipulator.

* * * * *